United States Patent [19]
Tsuji et al.

[11] Patent Number: 5,138,005
[45] Date of Patent: Aug. 11, 1992

[54] PROCESS FOR PREPARING UNSATURATED NITRILE/CONJUGATED DIENE COPOLYMER RUBBER

[75] Inventors: Suguru Tsuji, Tokyo; Hiromi Numata, Kawasaki, both of Japan

[73] Assignee: Nippon Zeon Co., Ltd., Tokyo, Japan

[21] Appl. No.: 687,656

[22] Filed: Apr. 19, 1991

[30] Foreign Application Priority Data

Apr. 20, 1990 [JP] Japan .................................. 2-106699

[51] Int. Cl.$^5$ ............................................ C08F 136/06
[52] U.S. Cl. .................................. 526/340.1; 526/88; 526/341; 526/335
[58] Field of Search ...................... 526/88, 340.1, 341; 525/242

[56] References Cited

U.S. PATENT DOCUMENTS 3,903,201  9/1975  Childers et al. ..................... 525/126

Primary Examiner—Joseph L. Schofer
Assistant Examiner—David Wu
Attorney, Agent, or Firm—Armstrong, Nikaido, Marmelstein, Kubovcik & Murray

[57] ABSTRACT

An unsaturated nitrile/conjugated diene copolymer rubber is prepared by an aqueous suspension polymerization of a monomer mixture of a conjugated diene monomer, a nitrile group-containing unsaturated monomer and an optional copolymerizable monomer. The suspension polymerization is carried out in an aqueous medium in a reactor provided with an agitating element under the following conditions:

(1) the water/monomer mixture weight ratio is from 0.1 to 4,
(2) 0.01 to 5 weight parts, per 100 weight parts of the monomer mixture, of a dispersing agent is used, and
(3) the agitating element is rotated under conditions such that the speed (U m/sec) of the tip thereof, expressed by the formula: $U = \pi \times D \times n$, is from 1 to 20, wherein D is diameter (m) of the rotation circle of the agitating element and n is number of revolutions (per second) of the agitating element.

5 Claims, No Drawings

PROCESS FOR PREPARING UNSATURATED NITRILE/CONJUGATED DIENE COPOLYMER RUBBER

BACKGROUND OF THE INVENTION (1) Field of the Invention

This invention relates to a process for preparing an unsaturated nitrile/conjugated diene copolymer rubber wherein a monomer mixture comprising a conjugated diene monomer and a nitrile group-containing unsaturated monomer is polymerized in the state of being suspended in an aqueous reaction medium.

(2) Description of the Related Art

Several processes have heretofore been proposed for the commercial production of an unsaturated nitrile/conjugated diene copolymer rubber. A typical example of the proposed processes involves emulsifying a monomer mixture of a nitrile group-containing unsaturated monomer and a conjugated diene monomer in an aqueous medium by an appropriate emulsifying agent, and effecting the polymerization by incorporating a radical polymerization initiator in the monomer-emulsified aqueous reaction medium. The resulting copolymer has problems such that it contains a salient amount of residues including the emulsifying agent and an inorganic salt, exhibits a corrosive action for metals and has a poor electrically insulating property.

The above-mentioned problems can be solved to an appreciable extent by employing a solution polymerization process or a bulk polymerization process. However, the solution polymerization process results in a polymer having a low molecular weight, and the step of recovering a solvent from the polymerization mixture after polymerization is indispensable and the equipment cost is high. In the bulk polymerization process, the viscosity of the reaction mixture violently increases as the reaction proceeds, and an agitator of a high power is necessary, and it often becomes difficult to remove the heat of polymerization and control the polymerization.

A suspension polymerization process does not offer the above-mentioned problems of the solution or bulk polymerization process, but with regard to the preparation of an unsaturated nitrile/conjugated diene copolymer rubber, only one example is known wherein a monomer mixture is polymerized in an organic solvent (see Japanese Examined Patent Publication No. 50-33519). An attempt has not been made wherein an unsaturated nitrile/conjugated diene copolymer rubber is prepared by a suspension polymerization process using an aqueous medium, because blocking or sticking of polymer particles occurs to a considerable extent.

SUMMARY OF THE INVENTION

A primary object of the present invention is to provide a process for preparing an unsaturated nitrile/conjugated diene copolymer rubber by a suspension polymerization process using an aqueous medium wherein the produced copolymer rubber particles are stably dispersed in the state of a suspension, blocking of the particles does not occur and the particles exhibit a satisfactory coagulating property and drying property.

In accordance with the present invention, there is provided a process for preparing an unsaturated nitrile/conjugated diene copolymer rubber from a monomer mixture comprising a conjugated diene monomer and a nitrile group-containing unsaturated monomer by an aqueous suspension polymerization process wherein the suspension polymerization is carried out under the following conditions in a reactor provided with an agitating element:

(1) the weight ratio of water to the monomer mixture is from 0.1 to 4,
(2) a dipersing agent is used in an amount of 0.01 to 5 parts by weight per 100 parts by weight of the monomer mixture, and
(3) the agitating element is rotated under conditions such that the speed (U meter/second) of the tip thereof, expressed by the following formula (I), is from 1 to 20:

$$U = \pi \times D \times n \tag{I}$$

where D is diameter (meter) of the rotation circle of the agitating element, and n is number of revolutions (per second) of the agitating element.

DESCRIPTION OF THE PREFERRED EMBODIMENTS

In a typical procedure of the suspension polymerization of the present invention, monomers, a dispersing agent and a polymerization initiator are incorporated in water in a reactor provided with an agitating element such as stirring blades or vanes, where the monomers are polymerized under agitation.

The monomer mixture used in the present invention comprises a conjugated diene monomer such as 1,3-butadiene, isoprene or 1,3-pentadiene, a nitrile group-containing unsaturated monomer such as acrylonitrile or methacrylonitrile, and an optional monomer copolymerizable with the conjugated diene monomer and the nitrile group-containing monomer.

As the copolymerizable monomer, there can be mentioned aromatic vinyl monomers such as styrene, α-methylstyrene and divinylbenzene; unsaturated carboxylic acids such as acrylic acid, methacrylic acid, itaconic acid and maleic acid, and salts of these unsaturated carboxylic acids; esters of unsaturated carboxylic acids such as methyl acrylate, 2-ethylhexyl acrylate and methyl methacrylate; alkoxyalkyl esters of unsaturated carboxylic acids such as methoxyethyl acrylate and methoxyethoxyethyl acrylate; amides such as acrylamide, methacrylamide, N-methylolacrylamide, N-methylolmethacrylamide, N,N'-dimethylolacrylamide, N,N'-dimethylolmethacrylamide, N-ethoxymethylacrylamide and N-ethoxymethylmethacrylamide; cyano-substituted alkyl acrylates and methacrylates such as cyanomethyl acrylate, cyanomethyl methacrylate, 2-cyanoethyl acrylate, 2-cyanoethyl methacrylate, 2-ethyl-6-cyanohexyl acrylate and 2-ethyl-6-cyanohexyl methacrylate; and epoxy group-containing monomers such as allyl glycidyl ether, glycidyl acrylate and glycidyl methacrylate.

The composition of units derived from the respective monomers in the copolymer is preferably such that the conjugated diene monomer is 55 to 90% by weight, the nitrile group-containing unsaturated monomer is 10 to 45% by weight, and the copolymerizable monomer is 0 to 20% by weight, based on the weight of the copolymer. If the amount of the nitrile group-containing unsaturated monomer is smaller than 10% by weight, the copolymer rubber has a poor oil resistance. If the amount of the nitrile group-containing unsaturated monomer exceeds 45% by weight, the modulus of elasticity is reduced.

As the dispersing agent, there can be mentioned water-soluble cellulose ethers such as methyl cellulose, hydroxyethyl cellulose, hydroxypropyl cellulose, hydroxypropylmethyl cellulose and carboxymethylcellulose; polyvinyl alcohol; water-soluble polymers such as polyacrylic acid and gelatine; polyethylene glycol dialiphatic acid esters; starch; tragacanth gum; and gum arabic. Of these, polyvinyl alcohol and water-soluble cellulose ethers are preferable. These dispersing agents may be used either alone or in combination.

The amount of the dispersing agent varies depending upon the particular dispersing agent, but is preferably 0.01 to 5 parts by weight, more preferably 0.05 to 3 parts by weight, per 100 parts by weight of the monomer mixture. With smaller than 0.01 part by weight of the dispersing agent, the effect of the dispersing agent cannot be obtained to any appreciable extent. If the amount of the dispersing agent is larger than 5 parts by weight, the viscosity of the polymerization mixture increases to an undue extent.

As the polymerization initiators, there can be mentioned monofunctional organic peroxides such as benzoyl peroxide, t-butyl peroxypivalate, diisopropyl peroxydicarbonate and acetyl peroxide; bifunctional organic peroxides such as 2,5-dimethyl-2,5-di(2-ethylhexanoyl-peroxy)hexane, 2,5-dimethyl-2,5-di(2-ethylhexanoyl-peroxy)hexyne-3 and 1,6-hexanediol-bis-t-butyl peroxycarbonate; and azo compounds such as 2,2'-azobisisobutyronitrile. Of these, bifuctional organic peroxide is preferable. The polymerization initiator is used usually in an amount of 0.01 to 5 parts by weight per 100 parts by weight of the monomer mixture.

The polymerization temperature is preferably in the range of 50° to 130° C., although the suitable temperature varies depending upon the particular polymerization initiator and the particular polymerization procedure employed.

In the aqueous suspension polymerization of a mixture of a conjugated diene monomer with a nitrile group-containing unsaturated monomer, the polymer particles become sticky as the polymerization proceeds. To minimize the undesirable increase of the stickiness and stably disperse the polymer particles in the aqueous medium, the weight ratio of water to the monomer mixture must be in the range of 0.1 to 4, preferably 0.3 to 2.5; the dispersing agent is used in an amount of 0.01 to 5 parts by weight, preferably 0.05 to 3 parts by weight, per 100 parts by weight of the monomer mixture; and the speed (U) of the tip of the agitating element, expressed by the formula (I), must be in the range of 1 to 20 meter/second, preferably 2 to 10 meter/second.

When the water/monomer mixture weight ratio and the amount of the dispersing agent are maintained in the above-mentioned ranges, the suspension of the reaction mixture has an appropriate viscosity and becomes uniform under agitation. When the water/monomer mixture weight ratio is smaller than 0.1, the viscosity of the suspension drastically increases and blocking of polymer particles occurs as the polymerization proceeds.

Even though the water/monomer mixture weight ratio is maintained in the above-mentioned ranges, when the speed (U) of the tip of the agitating element is lower than 1 meter/second, a stable suspension cannot be obtained. If the tip speed (U) is higher than 20 meter/second, the agitating power is too large and blocking of polymer particles occurs prominently.

In the preparation of the unsaturated nitrile/conjugated nitrile copolymer rubber according to the present invention, gelation occurs to an appreciable extent as the polymerization proceeds, and therefore, it is preferable to control the conversion below 50%.

The other conditions and procedures of the aqueous suspension polymerization are not particularly limited. For example, charging of water, monomers, a dispersing agent and polymerization initiator can be carried out in a conventional manner. If desired, a molecular weight modifier, a chain transfer agent and a pH controller can be added.

The molecular weight of the unsaturated nitrile/conjugated diene copolymer rubber prepared in the present invention is not particularly limited and can be varied depending upon the intended use thereof. The copolymer rubber may be either liquid or solid.

According to the present invention, an aqueous suspension polymerization process can be advantageously carried out for the preparation of an unsaturated nitrile/conjugated diene copolymer rubber, although the aqueous suspension polymerization has not been heretofore employed for this copolymer rubber. As compared with conventional emulsion polymerization, solution polymerization and bulk polymerization processes, in the aqueous suspension polymerization of the present invention, the polymerization can be easily controlled, the amounts of polymerization aids are minor, and therefore, an unsaturated nitrile/conjugated diene copolymer rubber of a high purity can be advantageously obtained.

The present invention will now be described in detail with reference to the following examples that by no means limit the scope of the invention. In the examples including the comparative examples, "part" and "%" are by weight unless otherwise specified.

EXAMPLE 1

A cylindrical reactor having an inner volume of 10 liters and provided with an agitator having marine blades was used. The side wall of the reactor had two peep holes for observing the inside.

The reactor was charged with 2,160 g (60 parts) of butadiene, 1,440 g (40 parts) of acrylonitrile, 3,600 g (100 parts) of water and 18 g (0.5 part) of polyvinyl alcohol as a dispersing agent, and the mixture was stirred to prepare an aqueous suspension. Then 18 g (0.5 part) of 2,5-dimethyl-2,5-di(2-ethylhexanoyl-peroxy)-hexane as a polymerization initiator was added to effect polymerization at 65° C. for 30 hours.

By observing the inside of the reactor through the peep holes, it was found that blocking did not occur during the polymerization and a good suspension state could be maintained. The suspension taken out from the reactor after the completion of polymerization was stable and the adhesion of the polymer on the inner wall of the reactor was not found.

The suspension taken out from the reactor was added dropwise into methyl alcohol having dissolved therein hydroquinone and alkylated phenol to precipitate a rubbery polymer. The conversion was calculated from the weight of the polymer prepared by drying the precipitated polymer under a reduced pressure. The Mooney viscosity was measured according to JIS K-6300.

In a cylindrical metal wire netting of a 150 mesh was placed 3 g of the rubbery polymer and immersed in tetrahydrofuran at room temperature for 48 hours. The amount of the residue (i.e., gel fraction) remained undissolved in the netting was measured and expressed as % based on the rubbery polymer placed in the netting. The results are shown in Table 1.

EXAMPLES 2 TO 5 AND COMPARATIVE EXAMPLES 1 TO 4

Using the same apparatus as that described in Example 1, rubbery copolymers were prepared and evaluated wherein the water/monomer mixture weight ratio, the kind and amount of monomers, the kind and amount of dispersing agents, the kind and amount of polymerization initiators and the speed of the tip of the agitation blade were varied as shown in Table 1. The polymerization recipe and conditions, and the state of suspension and other evaluation results are shown in Table 1.

As seen from Table 1, in the process of the present invention, blocking of polymer particles does not occur during polymerization, and therefore, the polymerization can be controlled easily and the content of gel in the polymer is very small.

TABLE 1

| Recipe & conditions of polymerization | Examples | | | | |
|---|---|---|---|---|---|
| | 1 | 2 | 3 | 4 | 5 |
| Water (parts) | 100 | 100 | 300 | 400 | 20 |
| Monomers: | | | | | |
| Butadiene | 60 | 90 | 65 | 80 | — |
| Isoprene | — | — | — | — | 70 |
| Acrylonitrile | 40 | — | 25 | 10 | 20 |
| Methacrylonitrile | — | 10 | — | — | — |
| Methacrylic acid | — | — | 10 | — | — |
| Styrene | — | — | — | 10 | — |
| Butyl acrylate | — | — | — | — | 10 |
| Water/monomer weight ratio | 1 | 1 | 3 | 4 | 0.2 |
| Dispersing agent | Partially saponified polyvinyl alcohol | Methyl cellulose | Hydroxyethyl cellulose | Carboxymethyl cellulose | Polyacrylic acid |
| Amount of dispersing agent (parts) | 0.5 | 2 | 0.05 | 5 | 0.01 |
| Polymerization initiator | 2,5-DiMe-2,5-di(2-Et-hexanoylperoxy)-hexane | t-Butyl-peroxypivalate | Diisopropylperoxy-dicarbonate | Acetyl peroxide | Azobisisobutyronitrile |
| Amount of polymerization initiator (parts) | 0.5 | 0.25 | 5 | 0.2 | 0.25 |
| Agitation: | | | | | |
| No. of revolutions (/sec) | 6 | 35 | 3.5 | 13 | 26 |
| Diameter of rotation circle (m) | 0.12 | 0.18 | 0.10 | 0.12 | 0.12 |
| Tip speed (m/sec) | 2.3 | 19.8 | 1.1 | 4.9 | 9.8 |
| State of polymerization system | Polymer well dispersed | Viscosity increased, but polymer well dispersed | *1 Polymer well dispersed | Polymer well dispersed | Polymer well dispersed |
| Conversion (%) | 35 | 27 | 48 | 22 | 23 |
| Mooney viscosity | 74 | 52 | *2 | 33 | 41 |
| Insoluble residue (%) | 0.2 | Below 0.1 | 0 | Below 0.1 | 0.1 |

Note
*1: Monomer was separated immediately after initiation of polymerization, but the dispersion of polymer particles became good as the polymerization proceeded.
*2 Liquid state, molecular weight = 5,000 as determined by high speed liquid chromatography.

| Recipe & conditions of polymerization | Comparative Examples | | | |
|---|---|---|---|---|
| | 1 | 2 | 3 | 4 |
| Water (parts) | 100 | 200 | 450 | 8 |
| Monomers: | | | | |
| Butadiene | 60 | 60 | 60 | 60 |
| Isoprene | — | — | — | — |
| Acrylonitrile | 40 | 40 | 40 | 40 |
| Methacrylonitrile | — | — | — | — |
| Methacrylic acid | — | — | — | — |
| Styrene | — | — | — | — |
| Butyl acrylate | — | — | — | — |
| Water/monomer weight ratio | 1 | 2 | 4.5 | 0.08 |
| Dispersing agent | Methyl cellulose | Methyl cellulose | Methyl cellulose | Methyl cellulose |
| Amount of dispersing agent (parts) | 0.008 | 2 | 7 | 0.5 |
| Polymerization initiator | t-Butyl-peroxypivalate | t-Butyl-peroxypivalate | t-Butyl-peroxypivalate | t-Butyl-peroxypivalate |
| Amount of polymerization | 0.25 | 0.25 | 0.25 | 0.25 |

TABLE 1-continued

| | | | | |
|---|---|---|---|---|
| initiator (parts) | | | | |
| Agitation: | | | | |
| No. of revolutions (/sec) | 40 | 1.6 | 6 | 15 |
| Diameter of rotation circle (m) | 0.18 | 0.16 | 0.12 | 0.12 |
| Tip speed (m/sec) | 22.6 | 0.8 | 2.3 | 5.7 |
| State of polymerization system | Blocking occurred as polym'n proceeded | *1 | Blocking occurred as polym'n proceeded | *2 |
| Conversion (%) | Impossible to measure | Impossible to measure | Impossible to measure | Impossible to measure |
| Mooney viscosity | — | — | — | — |
| Insoluble residue (%) | 35 | 20 | 31 | 24 |

Note
*1: Monomer was separated immediately after initiation of polymerization, and blocking occurred as the polymerization proceeded.
*2 Blocking occurred immediately after initiation of polymerization.

What is claimed is:

1. A process for preparing an unsaturated nitrile/conjugated diene copolymer rubber from a monomer mixture comprising, based on the weight of the monomer mixture, 55 to 90% by weight of a conjugated diene monomer, 10 to 45% by weight of a nitrile group-containing unsaturated monomer and 0 to 20% by weight of a monomer copolymerizable therewith by an aqueous suspension polymerization process wherein the suspension polymerization is carried out under the following conditions in a reactor provided with an agitating element:

(1) the weight ratio of water to the monomer mixture is from 0.1 to 4,
   (2) a dispersing agent is used in an amount of 0.01 to 5 parts by weight per 100 parts by weight of the monomer mixture, and
   (3) the agitating element is rotated under conditions such that the speed (U meter/second) of the tip thereof, expressed by the following formula (I), is from 1 to 20:

$$U = \pi \times D \times n \qquad (I)$$

where D is diameter (meter) of the rotation circle of the agitating element; and
   n is number of revolutions (per second) of the agitating element.

2. The process according to claim 1, wherein the suspension polymerization is carried out by using a bifunctional organic peroxide as a polymerization initiator.

3. The process according to claim 1, wherein the dispersing agent is selected from the group consisting of polyvinyl alcohol and water-soluble cellulose ethers.

4. The process according to claim 1, wherein the weight ratio of water to the monomer mixture is from 0.3 to 2.5.

5. The process according to claim 1, wherein the speed (U) of the tip of the agitating element is from 2 to 10 meter/second.

* * * * *